April 5, 1949.　　　　　　R. C. BURT　　　　　　2,466,150
AIRPORT RUNWAY
Filed Jan. 10, 1944

Inventor: Robert C Burt

Patented Apr. 5, 1949

2,466,150

UNITED STATES PATENT OFFICE 2,466,150

AIRPORT RUNWAY

Robert C. Burt, Pasadena, Calif.

Application January 10, 1944, Serial No. 517,758

10 Claims. (Cl. 244—114)

My invention relates to airplane landing fields wherein the abrasive action on the tires of landing planes is overcome or greatly reduced.

The primary object of my invention is to reduce the coefficient of friction of the surface of the landing strip at either or at both ends of the runway.

A further object of the invention is to flood with water predetermined portions of an airplane landing field.

A further object of the invention is to provide a shallow pool of water that covers a predetermined portion of the airfield, wherein the level of the pool is automatically maintained.

A further object of the invention is to provide an airplane runway in which the leeward end is lubricated.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

When an airplane makes a landing on an airfield, the stationary landing wheels contact the field's surface at the plane's landing speed. This action is very destructive to tires and presents a serious problem to land-based airplanes.

Some attempts have been made by various manufacturers to provide mechanical means for rotating the wheels prior to landing. While this method is helpful, it also adds weight to the plane as well as presenting a problem in synchronization. In my invention it is not necessary to further complicate the airplane with additional mechanism as it is accomplished by lubricating a predetermined portion of the airfield landing strip. This may be accomplished by lubricating the surface with fluid lubricant or with dry material having a low coefficient of friction.

One of the most desirable lubricants for rubber being water, this may be accomplished in a number of different ways, some of which are shown in the accompanying drawings.

Figure 1:
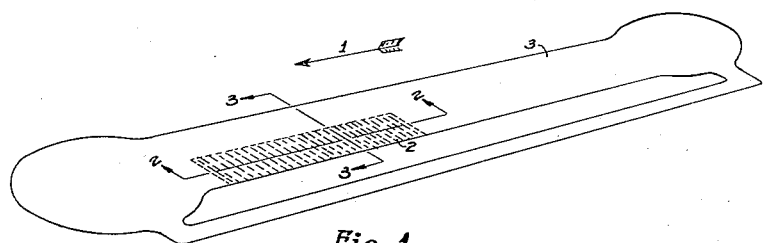
Fig. 1 is a perspective view of an airplane runway showing a shallow pool of water located near one end.
Figure 2:
Fig. 2 is a fragmentary sectional view taken on line 2—2, Fig. 1, looking in the direction indicated, showing mainly the pool section.

Fig. 1 shows a flooded level section of a runway. This application can be used where the field is level and where the prevailing wind is in one direction, indicated by arrow 1. The flooded section is in the form of a shallow pool 2 at the leeward end of the runway 3. This pool is formed by slightly depressing the desired area as shown in Fig. 2 which is a longitudinal section.

Figure 3:
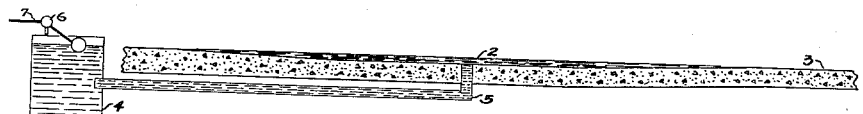
Fig. 3 is a fragmentary cross-sectional view of the runway pool taken on line 3—3, Fig. 1, showing the water sump and float valve control.

If the runway is a wide one, the flooded area may be confined to one side so that planes taking off may skirt the pool if they desire as shown in Fig. 3 which is a transverse section through the runway.

At the side of the runway in Fig. 3 is shown the water supply which comes from a sump 4 by gravity through a pipe or narrow canal 5 running out to the pool from the sump. The water level in the sump is maintained at the proper level by any convenient float valve controlling water from a feed pipe 7.

It will normally be found desirable to put the sump or supply system at the windward end of the pool so that in the event of a strong wind when the water is blown to the other end, a greater supply will be provided. If this entails an economic waste, the wind-blown water may be returned by a conduit (not shown) to the sump.

The water thickness may be from ⅛ inch up, depending on the type and speed of planes and the local wind velocity, but should never be enough to offer great resistance to the travel of the airplane. In some climates, such a pool will freeze and make an ice surface which is a low friction surface and will also accomplish the purposes of this invention. In such a climate it may be necessary to provide means of flooding the surface at intervals in order to renew the ice surface and keep it smooth if worn rough. The means for accomplishing this renewal will depend upon the climate and traffic and is not shown.

Figure 4:
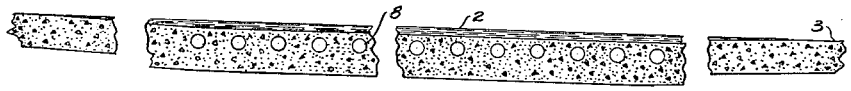
Fig. 4 is a cross-sectional view showing how the pool of water may be frozen by the placement of refrigeration under the pool's surface.

Under certain conditions, it may be desirable to keep this surface 2 frozen in warm weather and to do this it is only necessary to submerge refrigeration pipes 8 under the surface as shown in Fig. 4.

Figure 5:
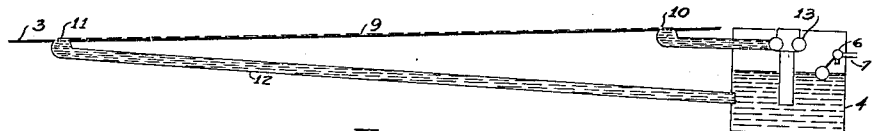
Fig. 5 is a cross-sectional view of the lubricated portion of the runway wherein a flowing sheet of water is employed.

Fig. 5 shows a flowing sheet of water 9. This is useful where there is a grade to the runway. Water from the header 10 flows in a sheet longitudinally down the sloping runway to a depressed drain 11 or off the sides of the runway and then flows through a return pipe 12 to the sump 4 from which the pump 13 lifts it to the header again. This system may be operated continuously or only upon the arrival of a plane as desired by the control tower. Such a system must be provided with means for replacing water lost through spray and evaporation and must be provided with proper precautions to protect it in freezing weather by heat or by anti-freeze.

This system may be used to maintain a thin sheet of ice on the leeward end of the runway in freezing weather and also accomplishes the purposes of this invention.

In some installations, it may be desirable to have the flow of water transverse of the landing strip in which case the header may be located either in the center with the drain on the side or the header may be on the side and the drain on the opposite side or in the center.

Figure 6:
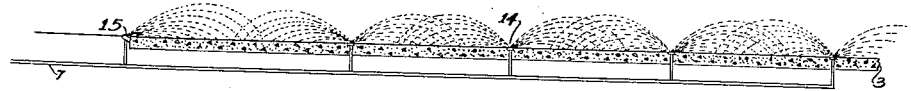
Fig. 6 is a cross-sectional view of the lubricated portion of the runway showing how a common sprinkling system may be used.

Two other forms of this invention are shown in Fig. 6 which is a cross-section of a runway which is kept wet by a sprinkling system either with flush sprinkler heads 14 or with a pipe along the side 15. In this system the water may be started just before the plane's arrival and cut off just before the plane lands.

In a less preferred form of this invention, the surface is lubricated with wax or with graphite and it is even possible to use smooth, round sand similar to that on ocean beaches, but this is much less desirable because it does not accomplish one of the desirable ends of this invention—that of cooling the tire as well as does the water.

It will be understood the drawing and description are to be considered merely as illustrative of and not restrictive on the broader claims appended hereto, for various changes in design, structure, and arrangement may be made without departing from the spirit and scope of said claims.

I claim:

1. An improved airplane landing runway comprising a surface on all or part of which a lubricated medium is retained by one or more depressions in the surface.

2. An aeroplane landing field having an area of its surface covered with grease, said grease covered area being large enough for the wheels of a landing and forward-moving aeroplane to land on and roll a suitable distance forward on before it reaches the ungreased area of the landing field, the grease being thick enough to cause the wheels of the moving aeroplane to slide and slip some in forward and sideways directions.

3. An aeroplane landing field having an area of its surface covered with a lubricant and another area of its surface not covered with a lubricant, said lubricated area being large enough for the wheels of a landing and forward-moving aeroplane to land and roll a suitable distance forward on before it reaches the unlubricated area of the landing field the lubricant being capable of causing the wheels of the moving aeroplane to slide and slip some in a forward and sideways direction.

4. An aeroplane landing field having an area of its surface covered with a fluid lubricant, said lubricant covered area being large enough for the wheels of a landing and forward-moving aeroplane to land on and roll a suitable distance forward on before it reaches the unlubricated area of the landing field, the lubrication being thick enough to cause the wheels of the moving aeroplane to slide and slip some in forward and sideways directions.

5. An aeroplane landing field having an area of its surface covered with water, said water-covered area being large enough for the wheels of a landing and forward-moving aeroplane to land on and roll a suitable distance forward on before it reaches the unwatered area of the landing field, the water being thick enough to cause the wheels of the moving aeroplane to slide and slip some in forward and sideways directions.

6. An aeroplane landing field having an area of its surface covered with wax, said wax-covered area being large enough for the wheels of a landing and forward-moving aeroplane to land on and roll a suitable distance forward on before it reaches the unwaxed area of the landing field, the wax causing the wheels of the moving aeroplane to slide and slip some in forward and sideways directions.

7. An aeroplane landing runway having an area of its surface depressed below the level of the portion of the runway around the depression and a fluid lubricant contained in the depression, the depression being large enough for the wheels of a landing and forward-moving aeroplane to land on and roll a suitable distance forward on before it reaches an undepressed portion of the runway, the lubricant being thick enough to cause the wheels of the forward-moving aeroplane to slide.

8. An aeroplane landing runway comprising a surface having a depressed area at a portion thereof, a sump for containing fluid lubricant located in relation to the depressed area, and a conduit for conducting the fluid from the sump to the depressed area, whereby fluid lubricant flows from the sump through the conduit to the depressed area to maintain fluid lubricant in the depressed area, the area covered by the fluid in the depressed area being large enough for the wheels of a landing and forward-moving aeroplane to land on and roll a suitable distance forward on before it reaches an undepressed portion of the runway, the fluid lubricant being thick enough to cause the wheels of the forward-moving aeroplane to slide and slip.

9. An aeroplane runway comprising a somewhat inclined portion on which an aeroplane is adapted to land, a sump containing a fluid lubricant located in proximity to said inclined portion, a pump located in relation to the sump to pump the fluid above the level of the fluid in the sump, a conduit from the downstream side of the pump to an upper part of said inclined portion, and a return conduit leading from a lower part of said inclined portion back to the sump, whereby operation of the pump causes a flow of fluid lubricant from the sump to the upper inclined portion, down the incline to the return conduit and back to the sump, the area of said inclined portion being large enough for the wheels of a landing and forward-moving aeroplane to land on and roll a distance forward on before it reaches an unlubricated area of the runway.

10. An aeroplane landing runway comprising a surface on which a fluid lubricating medium is adapted to be applied, and means for applying said fluid lubricant to said surface, said means comprising a plurality of spray nozzles extending to the surface of said portion from beneath the runway, and a conduit leading to said sprays and adapted to convey fluid lubricant under pressure, whereby when the fluid lubricant is brought through the conduit, sprays of the lubricant are spread over said runway portion, the area covered by the sprayed lubricant being large enough for the wheels of a landing and forward-moving aeroplane to land and roll a distance forward on before it reaches an unsprayed area of the runway, the rate of flow of the spray being sufficient to cause the wheels of the moving aeroplane to slide and slip somewhat in landing.

ROBERT C. BURT.

REFERENCES CITED

The following references are of record in the file of this patent:

UNITED STATES PATENTS

| Number | Name | Date |
| --- | --- | --- |
| 1,665,104 | Martienssen | Apr. 3, 1928 |
| 2,066,656 | Stromberg | Jan. 5, 1937 |

FOREIGN PATENTS

| Number | Country | Date |
| --- | --- | --- |
| 321,244 | Great Britain | Nov. 7, 1929 |